United States Patent
Nichani

(10) Patent No.: US 12,165,136 B2
(45) Date of Patent: Dec. 10, 2024

(54) METHOD AND SYSTEM FOR MANAGING LIFE CYCLE OF A TOKENIZED REAL ASSET IN A BLOCKCHAIN-BASED ECOSYSTEM

(71) Applicant: Suresh Nichani, Iselin, NJ (US)

(72) Inventor: Suresh Nichani, Iselin, NJ (US)

( * ) Notice: Subject to any disclaimer, the term of this patent is extended or adjusted under 35 U.S.C. 154(b) by 450 days.

(21) Appl. No.: 17/612,148

(22) PCT Filed: May 15, 2020

(86) PCT No.: PCT/US2020/033238
§ 371 (c)(1),
(2) Date: Nov. 17, 2021

(87) PCT Pub. No.: WO2020/236638
PCT Pub. Date: Nov. 26, 2020

(65) Prior Publication Data
US 2022/0222657 A1     Jul. 14, 2022

Related U.S. Application Data

(60) Provisional application No. 62/849,162, filed on May 17, 2019.

(51) Int. Cl.
*G06Q 30/00*     (2023.01)
*G06Q 20/36*     (2012.01)
(Continued)

(52) U.S. Cl.
CPC ....... *G06Q 20/3678* (2013.01); *G06Q 20/401* (2013.01); *G06Q 40/04* (2013.01); *G06Q 50/16* (2013.01); *G06Q 2220/00* (2013.01)

(58) Field of Classification Search
None
See application file for complete search history.

(56) References Cited

U.S. PATENT DOCUMENTS

2015/0332256 A1   11/2015   Minor
2017/0011460 A1*   1/2017   Molinari ............... H04L 9/3247
(Continued)

OTHER PUBLICATIONS

PCT, "Notification of Transmittal of the International Search Report and the Written Opinion of the International Searching Authority, or the Declaration", International Searching Authority, Jul. 30, 2020, pp. 1-12.

*Primary Examiner* — Matthew T Sittner
(74) *Attorney, Agent, or Firm* — CHIP LAW GROUP

(57) ABSTRACT

Disclosed is a method and system for managing life cycle of a tokenized real asset in a Blockchain-based ecosystem 100. The asset tokens of the real asset are put up for sale on a token issuance platform 118 and the proceeds from the sale are distributed to the asset owner, etc. The listing of asset tokens in the Blockchain-based ecosystem 100 requires project consensus which involves participation of key stakeholders who own utility tokens to participate in the community decision making. The asset tokens are then subjected to trading and maintenance which includes maintaining money flow corresponding to the real asset, selling the asset tokens by the asset token holders via an asset token exchange 808, and settlement of rewards to asset token holders via a settlement engine 810. Upon the end-of-term of the real asset, the asset tokens are terminated, and exit is enabled from the Blockchain-based ecosystem 100.

18 Claims, 16 Drawing Sheets

(51) Int. Cl.
  *G06Q 20/40* (2012.01)
  *G06Q 40/04* (2012.01)
  *G06Q 50/16* (2024.01)

(56) References Cited

U.S. PATENT DOCUMENTS

| | | | |
|---|---|---|---|
| 2017/0232300 A1 | 8/2017 | Tran et al. | |
| 2017/0337534 A1* | 11/2017 | Goeringer | G06Q 20/06 |
| 2018/0068359 A1* | 3/2018 | Preston | G06Q 30/0283 |
| 2019/0057362 A1 | 2/2019 | Wright et al. | |
| 2019/0340607 A1* | 11/2019 | Lynn | G06Q 20/4014 |
| 2020/0110855 A1* | 4/2020 | Cunningham | G06Q 20/3829 |

\* cited by examiner

METHOD AND SYSTEM FOR MANAGING LIFE CYCLE OF A TOKENIZED REAL ASSET IN A BLOCKCHAIN-BASED ECOSYSTEM

CROSS-REFERENCE TO RELATED APPLICATION

This application claims the benefit of U.S. Provisional Patent Application No. 62/894,9162 entitled "METHOD AND SYSTEM FOR MANAGING LIFE CYCLE OF A TOKENIZED REAL ASSET IN A BLOCKCHAIN-BASED ECOSYSTEM" and filed on May 17, 2019 for Suresh Nichani, which is incorporated herein by reference.

FIELD OF THE INVENTION

The invention generally relates to tokenomics, that is, token usage, utility and value in a Blockchain-based ecosystem for management of real assets such as, but not limited to, real estate. Specifically, the invention relates to a method and system for managing life cycle of a real asset which is tokenized into one or more asset tokens in a Blockchain-based ecosystem, which includes, but is not limited to, sale, distribution, trading and maintenance and termination of the asset tokens.

BACKGROUND OF THE INVENTION

Traditional real estate investing entails a multitude of issues. The most glaring issue is the high transaction fees involved in any real estate deals, often including excessive charges for middleman fees. The second issue is the illiquid market. On top of fees, the long processing time needed to go through all the intermediaries, unavoidably makes it a tedious process, which contributes to an illiquid market. Further, high transaction fees, including capital enough to sustain the long drawn-out process of investing in assets traditionally, set up a perceptively higher barrier of entry because the market appears to be suitable only for high net worth individuals who can bear extravagant costs, and requiring significant coordination from numerous parties.

Furthermore, the investment process is traditionally paper-driven, which becomes tedious and ineffective when many go-betweens are involved. Offline paper-based processes are generally inefficient, because of a need for coordination for sharing information across parties and can unnecessarily lengthen the time to close deals. Yet another issue with traditional real estate investing is the uncoordinated information flow. When multiple people and companies are involved in a single transaction, from inception to closing, information is disseminated multiple times, to multiple parties, which can easily lead to misunderstanding, misdirection, and mishandling of information. For instance, having little real-time visibility into what activities are taking place at every step of the dealing process may lead to an oversight in the monitoring and regulation of transactions.

Prior art solutions disclose two legacy models for managing investments and assets, without using blockchain. In a legacy platform model, stakeholders such as lawyers, brokers, investors, and entities connected to the platform are linked up and communicate with each other via a single point of contact, the platform. The key limitation is that any interactions will solely be platform-facing, and transactions only occur between the platform and each entity. Not only is this model too dependent on the central entity/platform, such limit in direction of communication results in network latency and lower liquidity within the system because of an inability for cross-communication among entities in the same system. The system is naturally inefficient. Fees at each point of transaction either solely belong to the entity or the platform.

In a legacy network model, stakeholders and entities are inter-connected with one another and with the platform. So, unlike the more inefficient model in the legacy platform, interactions are omni-directional and not reliant on a single point of contact. More transactions can occur between entities as multiple spending points are available, consequently resulting in greater amount of fees. The network model encourages greater liquidity and volume than the previous model. However, in such a network model, all parties and entities still act in their own interest as individualistic entities making their own choices. This mindset drives greater efficiency within the network but encourages parties to focus on their own interests above others' interests and hence possibly encouraging bad actors in the system for self-profit. Further, without a checking system or technology in this model to ensure transparency in communication, undesirable behavior in the system may become more easily overlooked. Also, in these legacy models, confirmations for trade on a traditional security or assets could take weeks to happen.

A few solutions exist which implement Blockchain-based architectures for dealing with investment funds and asset management, by remedying the pain points mentioned above. These solutions tokenize the assets and the tokens are used instead of fiat currency to buy and sell assets. However, these solutions lack a full-fledged ecosystem to manage the tokenization and tokenomics thereof.

Thus, there exists a need for an improved method and system for tokenizing a real asset in a Blockchain-based system and managing life cycle of the tokenized real asset.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
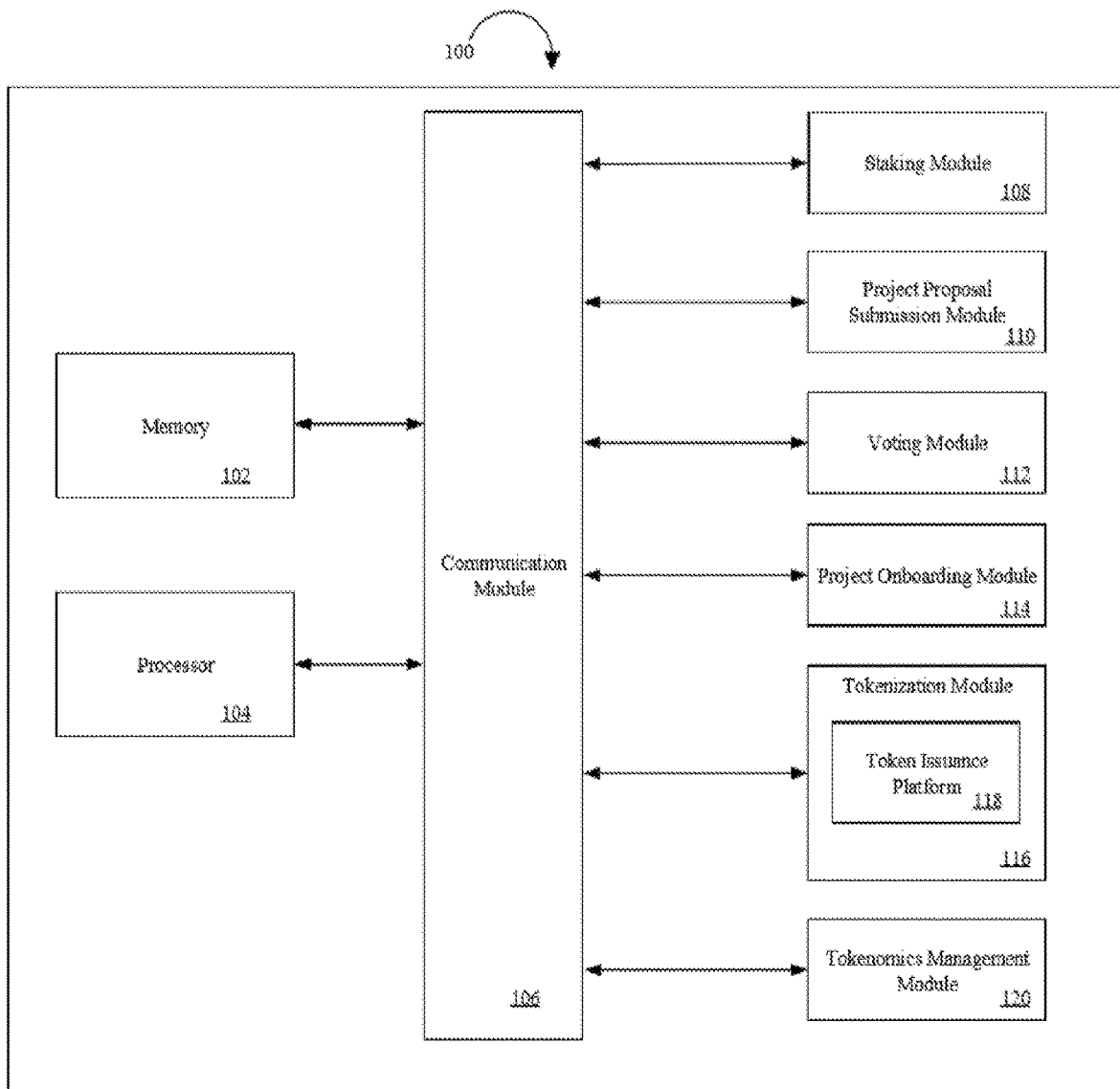
FIG. 1 illustrates a Blockchain-based ecosystem for managing life cycle of a tokenized real asset in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the invention, it should be observed that the embodiments reside primarily in combinations of method steps and system components for managing life cycle of a real asset which is tokenized into one or more asset tokens in a Blockchain-based ecosystem, which includes, but is not limited to, sale, distribution, trading and maintenance and termination of the asset tokens.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Various embodiments of the invention disclose a method and system for managing life cycle of a tokenized real asset in a Blockchain-based ecosystem. The Blockchain-based ecosystem enables staking of one or more utility tokens by one or more stakeholders. The one or more stakeholders then deposit the one or more utility tokens into smart contracts on the Blockchain-based ecosystem. These staked utility tokens provide the stakeholder access to one or more functions or services on the Blockchain-based ecosystem. The Blockchain-based ecosystem further enables asset owners to submit one or more project proposals such as, for instance, a proposal for tokenizing a real asset. Upon receiving submission of the one or more project proposals, the Blockchain-based ecosystem initiates a voting process by one or more stakeholders to achieve a network consensus for project onboarding. Subject to network consensus, a token issuance platform then generates one or more asset tokens for the real asset which is then handed over to do a custodian in the Blockchain-based ecosystem. In an ensuing step, the one or more asset tokens are put up for sale on the token issuance platform. The proceeds from the sale are disbursed to the asset owner, and asset token contracts are deployed automatically on the Blockchain-based ecosystem through smart contracts with standard pre-set variables and subjected to a code audit. The one or more asset tokens are then distributed to one or more purchasers/investors (asset token holders) of the real asset in relation to the sale. The Blockchain-based ecosystem further enables trading and maintenance of the one or more asset tokens which includes, but is not limited to, maintaining money flow corresponding to the real asset by an operator managing the real asset, allowing the asset token holders to sell the asset tokens via an asset token exchange, and settling of rewards to the asset token holders via a settlement engine. Thereafter, the one or more asset tokens are terminated, and the asset token holders can exit the Blockchain-based ecosystem upon the end-of-term of the real asset. This can be initiated by either a buyback of the real asset from the initial property owner, full sale of the real asset and partial exit for investors.

FIG. 1 illustrates a Blockchain-based ecosystem 100 for managing life cycle of a tokenized real asset in accordance with an embodiment of the invention.

As illustrated in FIG. 1, Blockchain-based ecosystem 100 comprises a memory 102 and a processor 104 communicatively coupled to memory 102. Memory 102 and processor 104 further communicate with various modules of Blockchain-based ecosystem 100 via a communication module 106.

Communication module 106 may be configured to transmit data between modules, engines, databases, memories, and other components of Blockchain-based ecosystem 100 for use in performing the functions discussed herein. Communication module 106 may include one or more communication types and utilizes various communication methods for communication within Blockchain-based ecosystem 100.

Blockchain-based ecosystem 100 further includes a staking module 108 which enables staking of one or more utility tokens by one or more stakeholders. The one or more stakeholders include, but need not be limited to, a project proposer (general practitioners (GPs)/property owners/developers), an investor (limited partners), an investment committee, a qualified service provider, and a general participant.

Staked utility tokens provide the one or more stakeholders access to one or more functions or services in Blockchain-based ecosystem 100. These include, but need not be limited to, regulation enforcement, acting as arbiters, voting on changes to the network, submission of proposals for voting, asset development services, legal counsel, and brokering or asset management.

Blockchain-based ecosystem 100 further includes a project proposal submission module 110 which enables one or more asset owners to submit one or more project proposals on Blockchain-based ecosystem 100.

Upon receiving submission of the one or more project proposals, a voting module 112 in Blockchain-based ecosystem 100 enables voting by the one or more stakeholders to achieve network consensus on the one or more project proposals in Blockchain-based ecosystem 100.

Subject to network consensus, a project onboarding module 114 in Blockchain-based ecosystem 100 allows the proposed projects to be onboarded or integrated into Blockchain-based ecosystem 100. Project onboarding module 114 further enables gamifying the project onboarding process and extending expression of project interest to ordinary users such as prospects or platform users of Blockchain-based ecosystem 100.

In an embodiment, an asset owner submits a project proposal for tokenization of a real asset via project proposal submission module 110. The real asset can be, but need not be limited to, real estate. A real asset is to be vetted before it can go through tokenization and the asset token is issued through consensus of both network participants and a professional investment committee.

Subject to network consensus achieved via a voting module 112 in Blockchain-based ecosystem 100, the project is onboarded to Blockchain-based ecosystem 100 via project onboarding module 114.

Blockchain-based ecosystem 100 further includes a tokenization module 116 which is integrated with a token issuance platform 118 for generating one or more asset tokens for the real asset.

An exemplary implementation of Blockchain-based ecosystem 100 along with the aforesaid processes of staking, project proposal submission, voting/review, project onboarding and tokenization are further described in detail in conjunction with FIGS. 2, 3, 4, 5 and 6.

Once the asset tokens are generated, an access control check is performed in Blockchain-based ecosystem 100. This process is further described in detail in conjunction with FIG. 7.

Once the process of tokenization of the real asset is complete, a tokenomics management module 120 in Blockchain-based ecosystem 100 is used to manage life cycle of the tokenized real asset. Various components of tokenomics management module 120 are further described in detail in conjunction with FIG. 8.

Figure 2:
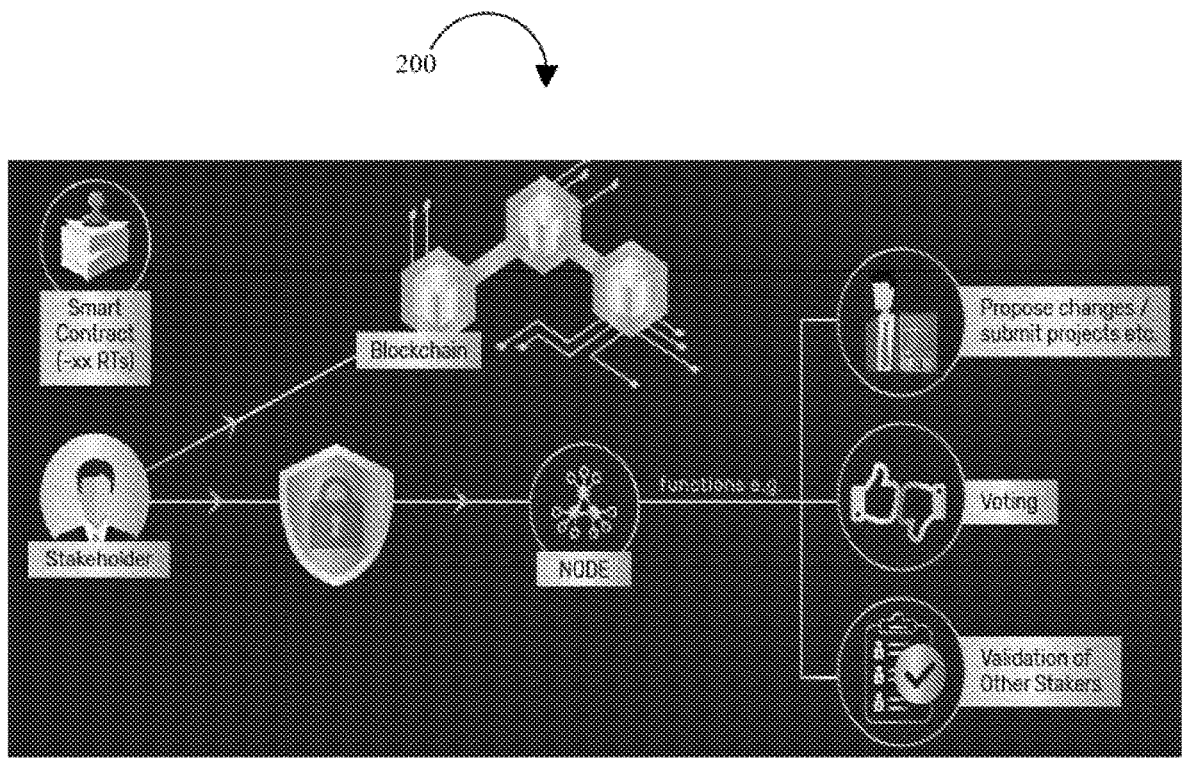
FIG. 2 illustrates a Tokenized Ownership Community (TOC) model in the Blockchain-based ecosystem in accordance with an embodiment of the invention.

FIG. 2 illustrates a TOC model 200 in Blockchain-based ecosystem 100 in accordance with an embodiment of the invention.

As illustrated in FIG. 2, Blockchain-based ecosystem 100 utilizes key tenets of decentralization in a trustless environment, by implementing TOC model 200 for a Real Assets Community Economy (hereinafter referred to as RACE) and its core functions/requirements. The community acts as a single entity in TOC model 200, whereby all participants profit together. Through the mechanism of staking, participants are given a form of ownership and secure their interest in the overall welfare of the RACE ecosystem. Actors are discouraged from undesirable behavior precisely because they have a stake in this system. Further, communication in this model is even more open because of the transparency in Blockchain transactions. Involved parties receive compensation democratically based on individual participation in projects or processes. In other words, task offers are made open for anyone in the ecosystem with the right skillset to take up, and if accepted and met with success, the person earns actor remuneration for his effort in the project. Thus, the peer-to-peer network of Blockchain-based ecosystem 100 provides a key benefit in connecting people and needs, bridging money, holders to projects needing investment, service providers to projects needing manpower, and even allowing asset owners/GPs to propose projects and investments. Further, the fees are kept open and competitive.

Further, TOC model 200 brings the most liquidity since token usage is ubiquitous on the operating aspect of Blockchain-based ecosystem 100. Transactional fees are kept minimal, if not near zero since all stakeholders are also operating nodes and compensated on joint prosperity in Blockchain-based ecosystem 100 rather than localized transactions alone. Blockchain-based ecosystem 100 updates in real time with all operating nodes equally updated on all aspects simultaneously, largely reducing the probability of a single point of failure or communication link failures.

There are three main groups of participants in the RACE community, namely project proposers, investors (limited partners), and qualified service providers.

The project proposers (GPs/property owners/developers) are people who have access or a contract to the assets/properties to tokenize them. Project proposers include, but need not be limited to, direct owners, general partners, or even developers who submit their projects for asset tokenization on the RACE platform by paying the network an initial listing fee.

A real estate limited partnership consists of general partners and limited partners. General partners co-invest with limited partners and hold the rights to manage the property. The General partners provide the critical initial capital to bind the transaction and continue to steer the transaction to fruitful results. They pick projects on the RACE platform and pay a fee to bid for projects to manage. They also must pay a subscription fee for every type of asset token under management. General partners also have a review system that is matched against the assets under their management. Further, their projections should closely follow the average yield as per reasonable market projections.

Investors/limited partners are co-investors in a real estate limited partnership along with the general partners. They are asset token purchasers, entitling them to partial ownership of properties, and pay for the transaction fees in RACE tokens during an asset token purchase. Limited partners can invest directly in every market, regardless of geographical constraints. RACE tokens are further explained in detail in conjunction with various embodiments.

The investment committee includes, but is not limited to, chief investment officers, lawyers, accountants, researchers, portfolio managers, tax advisors, real estate developers, appraisers and valuation experts, and asset managers. On the other hand, qualified service providers include, but need not be limited to, property managers, auditors, accountants/tax advisors, insurance providers and brokers, escrow/custodian, brokers, research analysts, and Blockchain developers. The general participants are the public who do not fall into the above three roles and can still be participants in the RACE platform. The general participants can look at the projects as prospective investors, and can lock up a small number of tokens to predict the outcome of a project that is undergoing due diligence and community review, and determine whether the project will be successfully listed. If they correctly predict the outcome, they are rewarded with a small stake.

Using TOC model 200, opportunities exist to design monetary policies surrounding token inflation, based on economic activity within Blockchain-based ecosystem 100 as well as secondary price action, to draw balance to a dynamic economy while increasing network effects of collective ownership by each additional asset or core function. The focus of this platform is thus to create a self-governing, self-sustaining system that perpetuates the wealth and success of everyone using it.

To participate in TOC model 200 as described above, interested parties are required to have some proof of ownership and indication of vested interest in Blockchain-based ecosystem 100. The core technical function of running nodes requires stakeholders to participate in the following three ways: staking RACE tokens, operating a RACE node, and participating in Blockchain-based ecosystem 100.

Stakeholders are first and foremost required to stake a fixed amount of RACE tokens. Staked tokens are locked up in a smart contract wallet with preset rules, which acts as a form of qualifier and pledging to the system. Stakeholders then commit RACE tokens to run a master node to prevent onboarding of malicious actors who may corrupt the system. Staking helps ensure that the master node operator has a share in the whole game and naturally less likely to cheat and sabotage the system. Even if the master node operator chooses to do so, he will be penalized in the form of devaluation of significant number of tokens he holds. In addition, with a staking model of operation, a portion of tokens are by design taken out of circulation. Thus, rather than minting or creating tokens over time, staking drives up the value of circulating RACE tokens.

The token economy of RACE tokens (RT) is a function of the number of nodes, staking costs, rewards of stake, and inflation rate and is progressively dynamic.

For instance, to qualify as a staker of RACE nodes, an individual is required to stake 50,000 RT. This number of tokens must be transferred to the RACE predefined smart contract wallet. At any time that the balance of the wallet falls below the required amount, the staker automatically loses all node privileges.

The incentivization/reward of staking is a function of the timeframe of staking such as, but not limited to, 0-3 months: 2% P·a, 3-6 months: 2.5% P·a, 6-9 months: 3% P·a, 9-12 months: 3.5% P·a, and every 3 month increment: +0.3% P·a capped at 5% P·a total.

The inflation rate of the total circulated number of RT is a function of the number of staking nodes and their respective rewards P·a. Not limiting the calculation of the inflation rate to the following example, if there are 100 Nodes with 2% P·a. 100 Nodes with 2.5% P·a., and 100 Nodes at 5% P·a, with an assumed total amount of tokens at 1 million, then:

Number of tokens created P·a=(100×10,000RT2%)+
(100×10,000RT×2.5%)+(100×
10,000RT×5%)=95,000RT per annum Token
Inflation Rate=95,000/(1Billion)×100%=9.5%
(Quantity)

Referring to the calculation, the macro inflation rate is derived and front-driven by staking activity (a decrease in stakers would similarly affect the inflation rate). This dynamism ensures that TOC model 200 is in turn run by a staking economy.

In accordance with an exemplary implementation, the RACE platform consists of two token layers, namely a utility token and a security token layer to complement the former (when the platform is ready), to form a real estate asset investment platform powered by Blockchain technology and Blockchain solutions.

A utility token (RACE community token (RT)) is a digital token of cryptocurrency that is issued to be later used to purchase goods or service offered by the issuer of the cryptocurrency. RACE tokens are created for the network to govern the market infrastructure and enable users to interact with the platform's services and activities.

The other type of token is the security token (RACE Asset Token (AT)). Securities are tradable financial assets, and security tokens are Blockchain-based digital assets stored cryptographically, which enables investors to own or transact a tradable asset. A Security Token Offering (STO) offers investors a range of financial rights and functions similar to an Initial Coin Offering (ICO), except that it offers security tokens rather than utility tokens. These tokens are backed by something tangible, such as assets like real estate. Additionally, security tokens are useful for providing legal protection for investors in the crypto community since they are backed by regulatory frameworks, reducing the chances of fraud and safeguard parties involved.

To issue ATs, asset owners and project proposers are required to pay a network fee in RTs to tokenize assets on the RACE Platform. The RACE Platform is designed with a dynamic pricing algorithm for the network fee. Variables include, but need not be limited to, legal complexity of the offering, value of the offering, token technical requirements, and number of unique asset tokens on both primary and secondary markets at any given time.

Post-staking, stakeholders are required to run an instance of the RACE system in the form of a software or node. In general, a node is a computer wallet that keeps a copy of the Blockchain in real-time while performing special functions. In the case of RACE, operating a RACE node grants special functions including participating in governance and voting. To set up a node, apart from staking a minimum amount of RACE tokens, a stakeholder downloads the core wallet and uses the core wallet to create a node. The core wallet integrates the stakeholder's computer as one of many nodes that supports the Blockchain that runs on a server. One stakeholder's node is always communicating with other nodes in the system, making up the decentralized network.

Finally, stakeholders in the RACE ecosystem are required to provide a key competency or function to the system, for example, as a service provider, or play a part towards the tokenization of an asset onboarded to the RACE platform. Various features of staking in TOC model 200 are as detailed.

Staking is a core technical functionality for the running of the nodes in the RACE ecosystem. By staking RACE tokens, a stakeholder deposits RACE tokens into a smart contract on the Blockchain such as, but not limited to, Ethereum Blockchain. The staked tokens in turn provide access to fundamental functions on the RACE ecosystem such as, but not limited to, regulation enforcement, acting as arbiters, voting on changes to the network, and submission of proposals for voting.

Staking RACE tokens is not equivalent to paying for access or transacting on the RACE ecosystem. The staked tokens are not acquired by the RACE ecosystem or any of the third parties. The tokens are instead locked securely on Blockchain-based ecosystem 100. The act of staking indicates that the stakeholder is prepared to put something significant enough on the line as affirmation of his/her involvement in the ecosystem and dedicates his/her competencies to grow the ecosystem. This then forms a natural network effect of early adopters who are highly incentivized to not just be participants but also ambassadors or affiliates of the network.

Further, staking is an important function to create a strong architecture of networked nodes. It is also key to a long-term, stable and resilient token economy. Because of growing nodes and consequently higher number of stakes in an expanding ecosystem, there is a positive organic value-driven pressure on the RACE token value.

There are four main anchors to staking RACE tokens: running and access to a node, participating in voting for proposal changes, participating in submission of proposal for voting, and participating in validation and/or audit of identity of stakeholders.

Running and Access to a Node: All stakers (or stakeholders) are granted access to a digital instance of a full node, which in effect stores RACE hashed metadata containing critical information to the entire ecosystem. All RACE nodes store the same information, updated near real-time. The hashed metadata in turn relays to a decentralized database on the Interplanetary File System (IPFS), an open sourced system, where majority of the RACE ecosystem data is stored. Retrieval of data from IPFS is called from the RACE nodes. By running a node, stakers function as gatekeepers to the entire wealth of storage and interactivity of the RACE ecosystem, which makes this a highly valued function.

Voting for Proposal Changes: Governance in the RACE ecosystem is open, transparent and decentralized. Stakers form the government and vote for proposals to be passed that will determine the functions of RACE ecosystem. Some examples of such proposals include, but need not be limited to, change in inflation rate of the macro system, change in rewards of running a node, change in number of RACE tokens required to stake, change in quorum, and change in the code base. For example, the quorum required to pass a proposal to be adopted in the RACE ecosystem would be 80% of all nodes. The reason for selecting a higher percentage is because, in its infancy, the number of nodes and stability of the system may not suffice to ensure bad actors do not launch a successful attack on the ecosystem.

Submission of Proposals: As above, proposals are submitted first to be approved for voting. Only stakers can submit proposals. To prevent overloading of the network from proposals, or causing heavy inconvenience to other stakers having to vote on spam proposals, every submitted proposal needs to be signed by at least 9 other nodes (total 10 including the submitter), before it is put forward for voting by the remaining nodes.

Validation and Audit of Identity of Other Stakers: Any new staker must undergo Know Your Customer (KYC), and have the roles and responsibilities understood and acknowledged by the staker. This act must be conducted by fellow stakers and validated off-chain using a robust checklist, before being approved as a staker. This precautionary step ensures robustness of the ecosystem and stresses the importance of the RACE validation process of participants. For instance, every new staker must be 100% approved by 3 referees (co-signee stakers) as well as 3 randomly selected stakers on-chain. Stakers can also be voted off, by 3 co-signee stakers and 3 randomly selected stakers. Stakers who are successfully voted off have their staking deposit forfeited (burned on-chain). This dynamic method of voting on/off stakers rewards good behavior and heavily penalizes bad actors.

Figure 3:
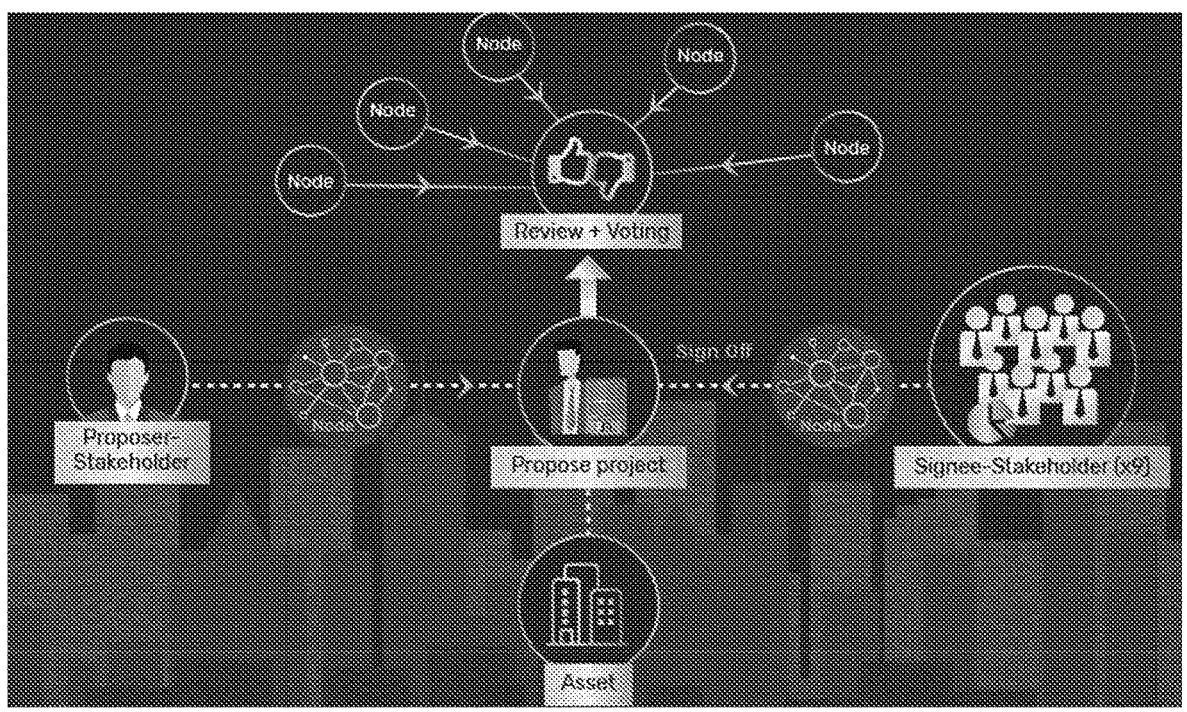
FIG. 3, FIG. 4 and FIG. 5 illustrate processes of project proposal submission, voting/review and project onboarding using the TOC model in the Blockchain-based ecosystem in accordance with an embodiment of the invention.
Figure 4:
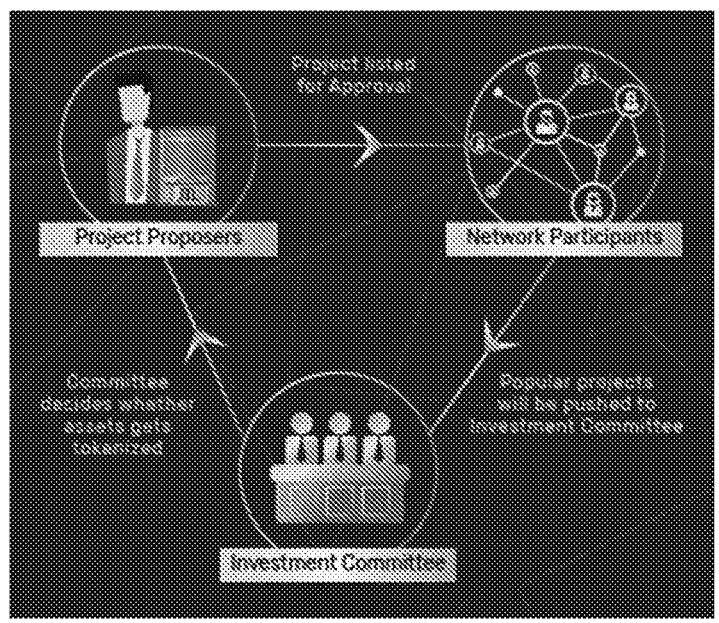
Figure 5:
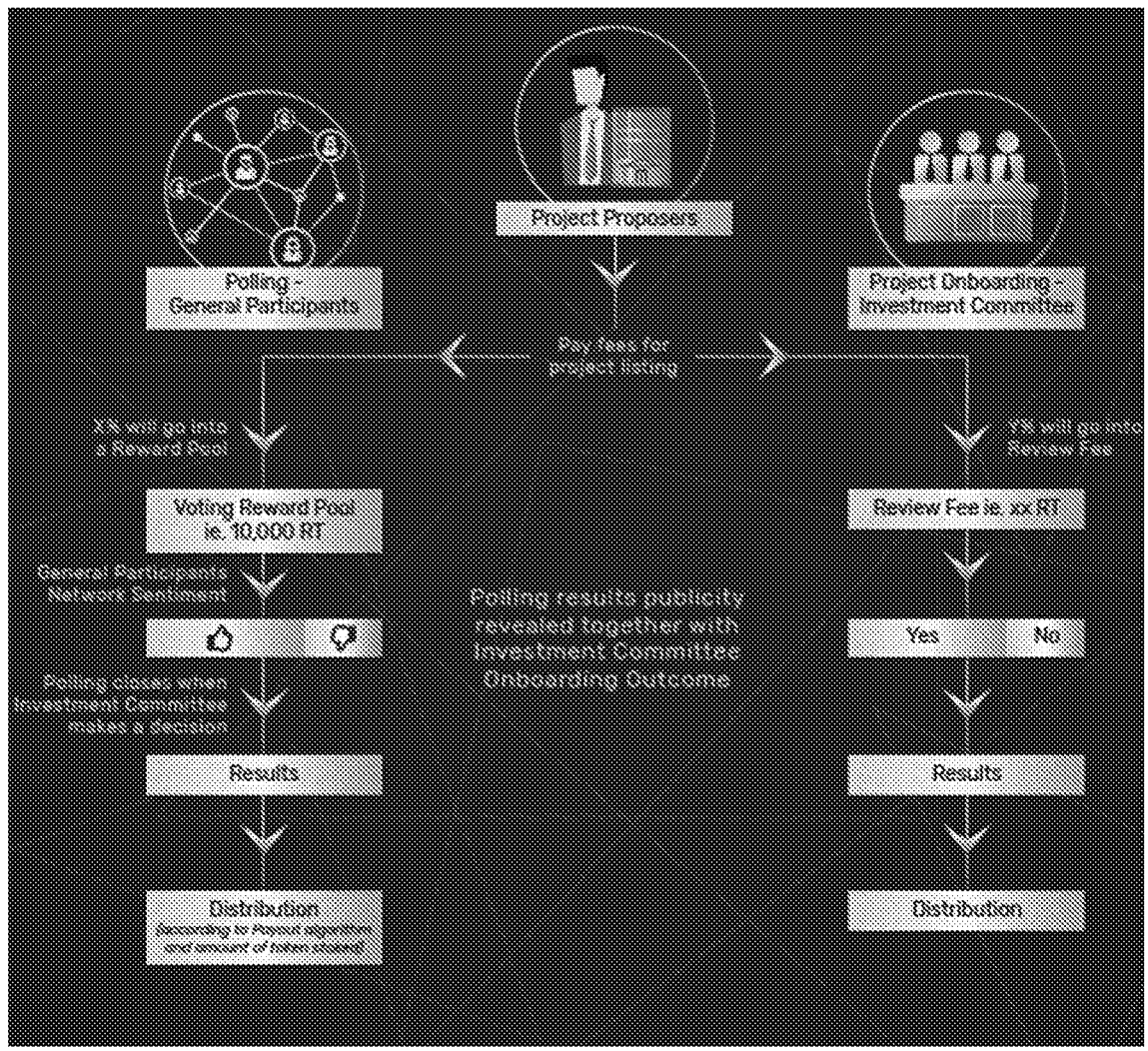

FIG. 3, FIG. 4 and FIG. 5 illustrate the processes of project proposal submission, voting/review and project onboarding using TOC model 200 in Blockchain-based ecosystem 100 in accordance with an embodiment of the invention.

As illustrated in FIG. 3, FIG. 4 and FIG. 5, an asset must be vetted before it can go through tokenization. RACE asset tokens can only be issued through consensus of both network participants and a professional investment committee.

Project proposers get their project proposals reviewed by both general participants as well as the investment committee. These reviews are separate and run in parallel. The fees for project listing are paid into a smart contract unique to the project, that will go towards two functions namely voting reward pool for general participants and review fee to be distributed and paid to the investment committee for their work done. The review process is also controlled by the same smart contract, and results are revealed only when the investment committee has completed their review and submitted their votes. The very same contract also performs the distribution for general participants and the investment committee for complete transparency of distribution.

As an additional consideration for greater engagement of community outside of those directly involved in the real estate ecosystem, project onboarding is gamified, and expression of project interest is extended to ordinary users such as prospects or platform users of RACE platform. This process involves three groups namely project proposers, general network participants and an investment committee.

Project proposers with good performance and positive track record can receive a discount factor for their network fee, to incentivize quality projects. Inversely, a premium is imposed on the network fee if an asset owner/project proposer has had a negative track record. Those with average track records may be subjected to review and subsequently imposed a premium.

Further, decentralized project consensus is enabled on the RACE platform. Companies or individuals can vote and review projects which is made transparent upon voting across the RACE platform. Reviewers are required to stake tokens for each review but can receive tokens for their work done upon a successful sale. Though the stakes are equal, project proposers have individual ratings, of which their review weightage is dependent on the number of successful proposals, acquisitions, sales and management associated to their reviews. Projects that receive a low review rating score are listed on the RACE platform for sale, and require further re-evaluation and can adjust their sale parameters before attempting assessment a second time at a discounted rate (which may be limited to only a second attempt). In such an event, the proposer/asset owner forfeits the initial listing fee, which is distributed across to the various stakeholders for their work done, including the reviewers.

Further, part of the standard due diligence process in acquiring a property involves valuation experts, lawyers, and property inspectors to vet and process documentation to ensure the interest of the asset token purchasers. These stakeholders are paid for their work done. Due diligence emolument is taken from the network fee paid for by asset owners/project proposers.

Another key aspect of the RACE platform is ownership transfer. Each transaction, or trading an AT on the AT Exchange, requires both the maker and taker to pay a transactional fee in RACE tokens. Since RACE ATs have a divisibility of zero decimal places, it is impossible to take a fraction of an AT for fees, unlike the trading of other cryptocurrencies. Therefore, the RT operates as mode in which transactional fee is paid in.

Figure 6:
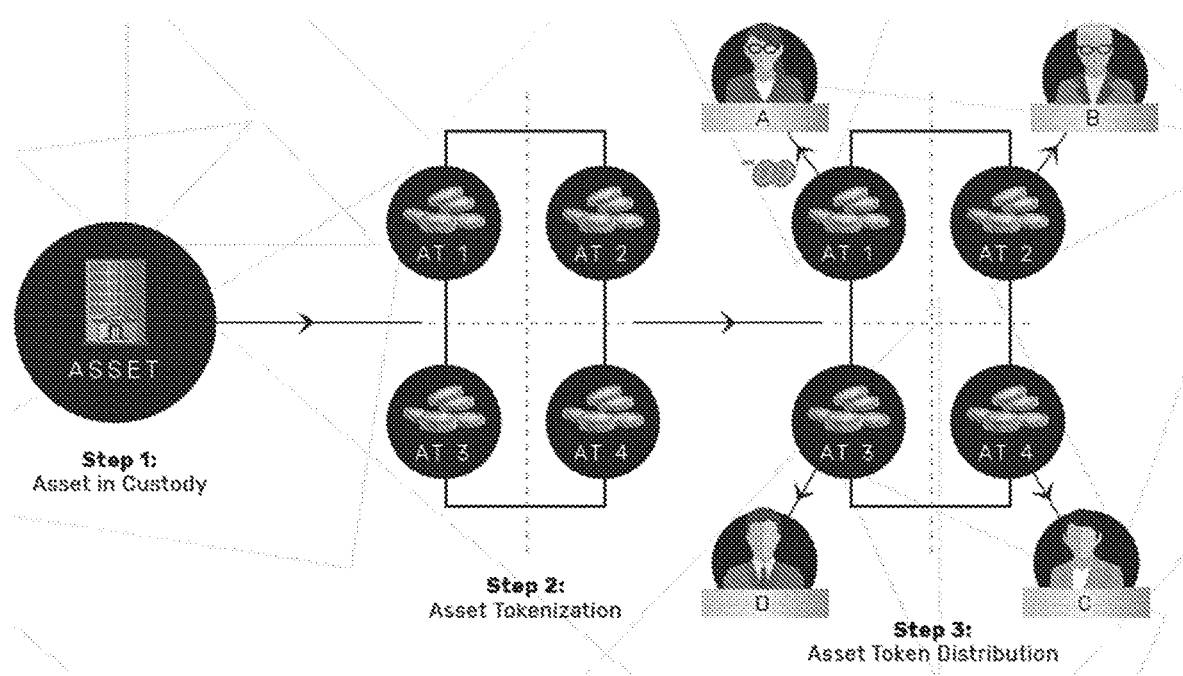
FIG. 6 demonstrates fractionalization and tokenization of asset ownership in accordance with an embodiment of the invention.

FIG. 6 demonstrates fractionalization and tokenization of asset ownership in accordance with an embodiment of the invention.

There are five core benefits to tokenizing real estate assets: better liquidity, faster and simpler settlement, lower transactional fees, transparent and anti-fraud system, and fractionalization.

Better Liquidity: A constantly open market and fractional ownership of securities further enable trading volumes because securities are now much more easily affordable at a fraction of the cost and commitment. By tokenizing a security in this way, it can increase the traded item's value, known as a liquidity premium, of up to 30% more of its initial value.

Faster and Simpler Settlement: Disintermediation through automation and the use of Blockchain makes the entire dealing process faster and secure. There is less capital lock up and more profits for all parties. With exchanges, algorithms and secure smart contracts help bypass traditional choke points and bureaucracy.

Lower Transactional Fees: Dealing parties need only concern themselves with exchange fees. Transfer of ownership is made far easier since asset owners and traders do not have to deal with too many intermediaries such as clearing houses or banks among the many organizations that would take a cut each step of the way. There is almost no cost to transactions that hinder or discourage change of ownership and profit reduction.

Transparent and Anti-Fraud System: To falsify transparent transaction information on the blockchain is virtually impossible. Prices of properties are objective and transparent, with users being able to view statistics including supply versus demand volume, buying prices versus selling prices and spreads.

Fractionalization: There is lower barrier of entry for securities. Access to institutional grade products that often carry higher return on investment is made available at a lower price to entry.

The RACE platform attracts assets to be transacted via its token standards/protocol, with the community protocol connecting people who have money with institutional quality assets to hold for cash flow and asset appreciation. These assets can become smaller constellations revolving around the core RACE protocol, which in turn attracts mini projects such as, but not limited to, asset projects, or real estate/infrastructure construction projects, or services projects. Each of these assets can follow the same dynamics as the main asset token and sub token issuances.

Traditional real estate limits investors. For those who are looking to start investing with a modest capital, it simply limits the individual since it requires him or her, at the minimum, to accommodate the entire value of a single property. Quality properties with above market yields or capital gain potential are also costlier, creating a higher barrier of entry for investors. For property owners who are looking to earn cash for only a fraction of their property's worth without the hassle of day-to-day maintenance, traditional real estate investment makes the situation impossible.

Tokenization makes these impossible situations possible. By converting the rights to an asset into a digital token, property owners can issue tokens, of which each token represents a fraction of the real estate's value. These tokens can then be freely bought and sold, and holders of these tokens gain a fraction of ownership in the asset, that is, buying all the tokens means 100% ownership of the asset.

Real estate owners then issue their properties' tokens on Blockchain-based ecosystem 100 supporting smart contracts, to facilitate the necessary contractual agreements protecting buyer and seller's interests and enable token transactions to occur on digital asset exchanges. Given Blockchain's immutability, the decentralized ledger ensures that once you buy in tokens, it accounts for your rightful ownership even if it is not registered in a government registry.

Asset tokenization with RACE allows property owners to tokenize an asset, creating its digital representation on Blockchain-based ecosystem 100 along with immutable ownership data and record, and subsequently enables all owners to trade tokens representing the asset to increase liquidity. Special Purpose Vehicles (SPVs) are created and designed for independent ownership, management and funding of assets on the RACE platform.

RACE asset tokens are unique tokens, each representing fractionalized ownership of an asset. Each asset is unique, tokenized with its own unique token symbol, denomination, prices, and buy in limits. Each token can be programmed with different rules to perform specific tasks which use RACE asset tokens as gas to interact with smart contracts or impose restrictions as needed according to different jurisdictions. Tokens can only be transferred to whitelisted users who are eligible to own and trade the asset tokens.

An asset token system process is illustrated in accordance with an embodiment of the invention.

Issued asset tokens consist of different sub token classes that act as different financing instruments. An asset is further divided into multiple subclass types with the use of meta tags embedded in each token that is read on the exchange or using a separate ERC20 token type all together.

Each asset token is based on any platform Blockchain (for example, the Ethereum ERC-20 Protocol) that is most suitable at the point of development of the RACE Platform, containing the standard variables such as symbol and decimals. Each asset token can be divided into subclasses that are Turing complete. Depending on the requirements and specifications of each asset token issuer and the complexity of the subclasses, the asset tokens are programmed to perform specific tasks, specific to their classes.

Figure 7:
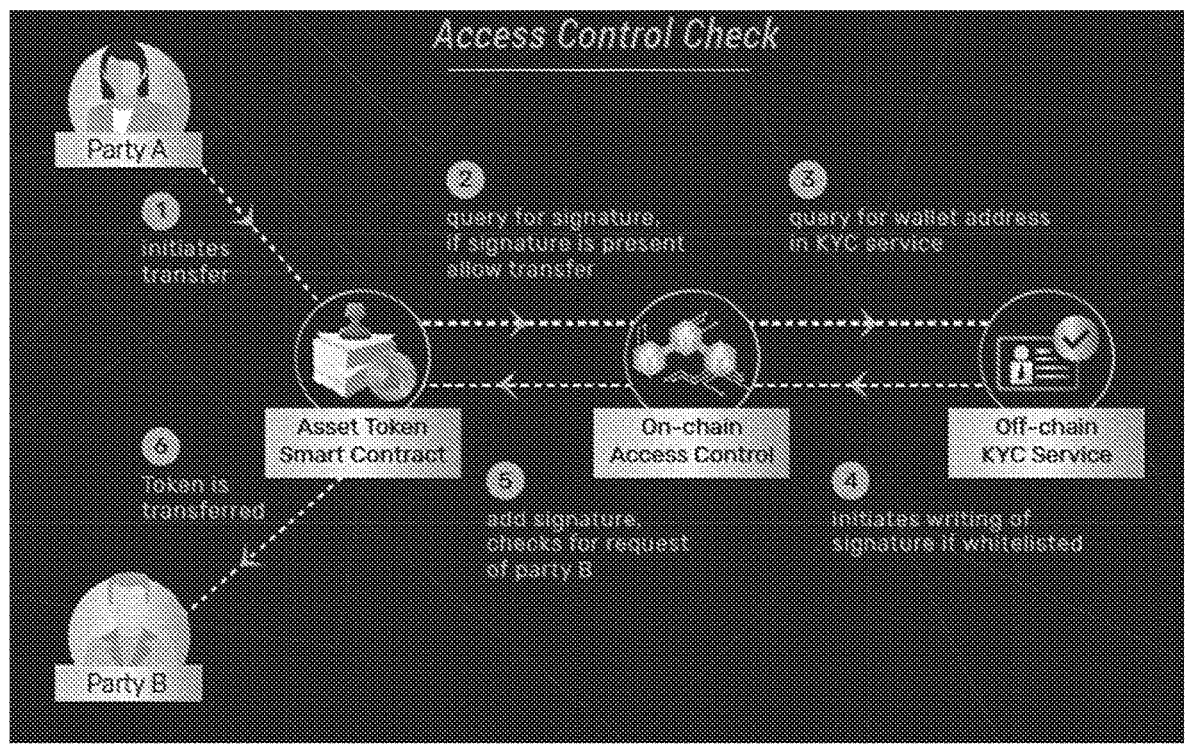
FIG. 7 illustrates access control check in the Blockchain-based ecosystem post tokenization of a real asset in accordance with an embodiment of the invention.

FIG. 7 illustrates access control check in Blockchain-based ecosystem 100 post tokenization of a real asset in accordance with an embodiment of the invention.

Various code functions employed in the Blockchain-based ecosystem 100 are as follows.

transferFrom( ): This function is used instead of a standard transfer( ) function. Each asset token has a unique smart contract that functions like a whitelist. A whitelist type of function is required to ensure that only verified people can hold and transfer the respective asset tokens.

deposit( ): Ethereum's ERC-223 deposit( ) function may also be deployed to ensure that a recipient of asset tokens has approved the transaction communicated prior to the sending of tokens. transfer( ) tokens must be pre-approved by only whitelisted addresses controlled on the RACE platform instead of utilizing the Blockchain. This helps to prevent accidental transfer of tokens to people who are whitelisted but are not the rightful owner of the token(s)/have not initiated a request to receive the token(s).

totalSupply: The totalSupply function is used to call and verify that only the declared number of tokens are created during the process. No additional tokens should be minted given the nature of the asset. This is extremely important as assets are "double spent" if more tokens are created, especially outside of the sale.

On-Chain Access Control: Each asset token smart contract is given the ability to whitelist pre-selected accounts on chain, with off-chain whitelisting KYC services controlling the logic. An asset token smart contract generates a signature granting access to a requestor (assuming the smart contract owner already consents). This access control is checked when performing both the transferFrom( ) and deposit( ) functions to ensure wallets have the required signatures and therefore whitelisted to own and transact the asset tokens.

Using signatures on Blockchain-based ecosystem 100 instead of hardcoding addresses into smart contracts ensures scalability of the ecosystem with existing wallets. Given new signatures each time a new asset token is being launched, asset tokens of same access nature are given existing signatures. This process is faster and is less gas intensive as compared to hard coded whitelisting.

In an embodiment, a Blockchain explorer is seamlessly integrated within the RACE platform. The Blockchain explorer reads information and maps the information on the platform. Important public information such as token symbols and wallet owners are encrypted. The system enables users on the platform to see information at each data point which is verified and presented as it is on the Blockchain, else indicates and alert users. The RACE platform can also be automated to take an action should a fraudulent smart contract be uploaded onto the platform that did not execute in a way that the asset owners presented on the platform.

Furthermore, asset token contracts are deployed automatically on the RACE platform through a smart contract with standard pre-set variables. Project proposers can, if needed, customize the smart contract details on the platform to be deployed on the Ethereum network or any suitable network at any point of the RACE platform's life. Customization is available as an option should the asset owners have their own developers. However, these custom smart contracts are subjected to a code audit. The RACE platform verifies and/or validates the presented information or warns users if the smart contract has failed audit or is malicious.

Figure 8:
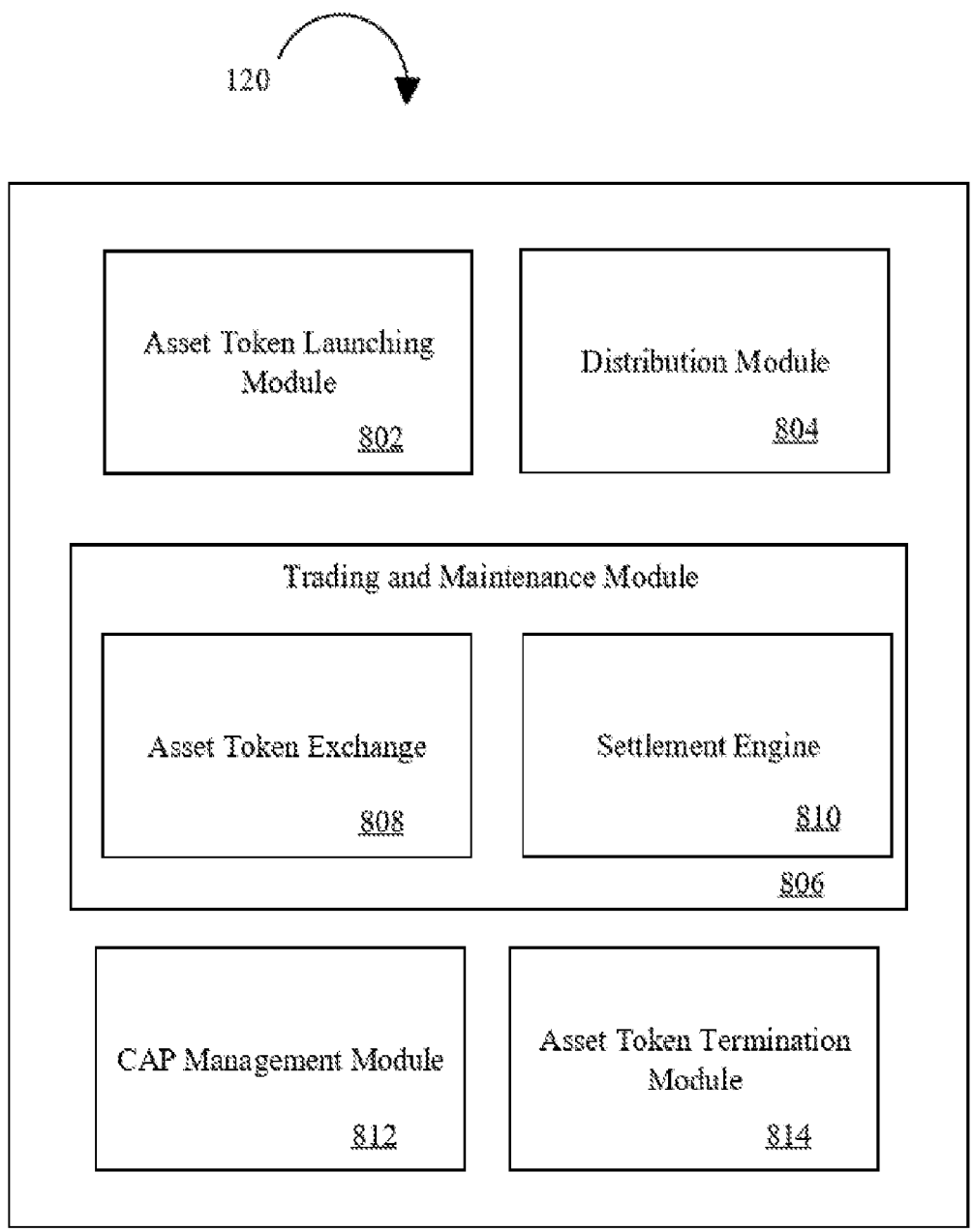
FIG. 8 illustrates components of a tokenomics management module for managing life cycle of a tokenized real asset in accordance with an embodiment of the invention.

FIG. 8 illustrates components of tokenomics management module 120 for managing life cycle of a tokenized real asset in accordance with an embodiment.

As illustrated in FIG. 8, once a real asset is tokenized into one or more asset tokens, an asset token launching module 802 of tokenomics management module 120 enables the one or more asset tokens to be put up for sale on token issuance platform 118. The process of launching an asset token is further described in detail in conjunction with FIG. 9.

Upon closing the sale, proceeds from the sale are disbursed to one or more purchasers/investors (asset token holders) of the real asset, in relation to the sale, via a distribution module 804 in tokenomics management module 120.

Tokenomics management module 120 further includes a trading and maintenance module 806 for enabling trading and maintenance of the one or more asset tokens in Blockchain-based ecosystem 100. Trading and maintenance module 806 enables maintaining money flow corresponding to the real asset by an operator managing the real asset, selling, by the asset token holders, the asset tokens via an asset token exchange 808, and settling of rewards to the asset token holders via a settlement engine 810 of Blockchain-based ecosystem 100. The process of trading and maintenance is further described in detail in conjunction with FIG. 10. Settlement engine 810 is further described in detail in conjunction with FIG. 11.

Distribution module 804 further enables distribution of asset tokens to the asset token holders in relation to the money flow which is managed by a capital (CAP) management module 812 of tokenomics management module 120. CAP management module 812 enables automation of a CAP table for the real asset. The management of distribution of the asset tokens to the asset token holders by CAP management module 812 is further described in detail in conjunction with FIG. 12.

Tokenomics management module 120 further includes an asset token termination module 814 for terminating the one or more asset tokens and enabling exit from Blockchain-based ecosystem 100 upon the end-of-term of the real asset. The process of termination is further described in detail in conjunction with FIG. 13.

Figure 9:
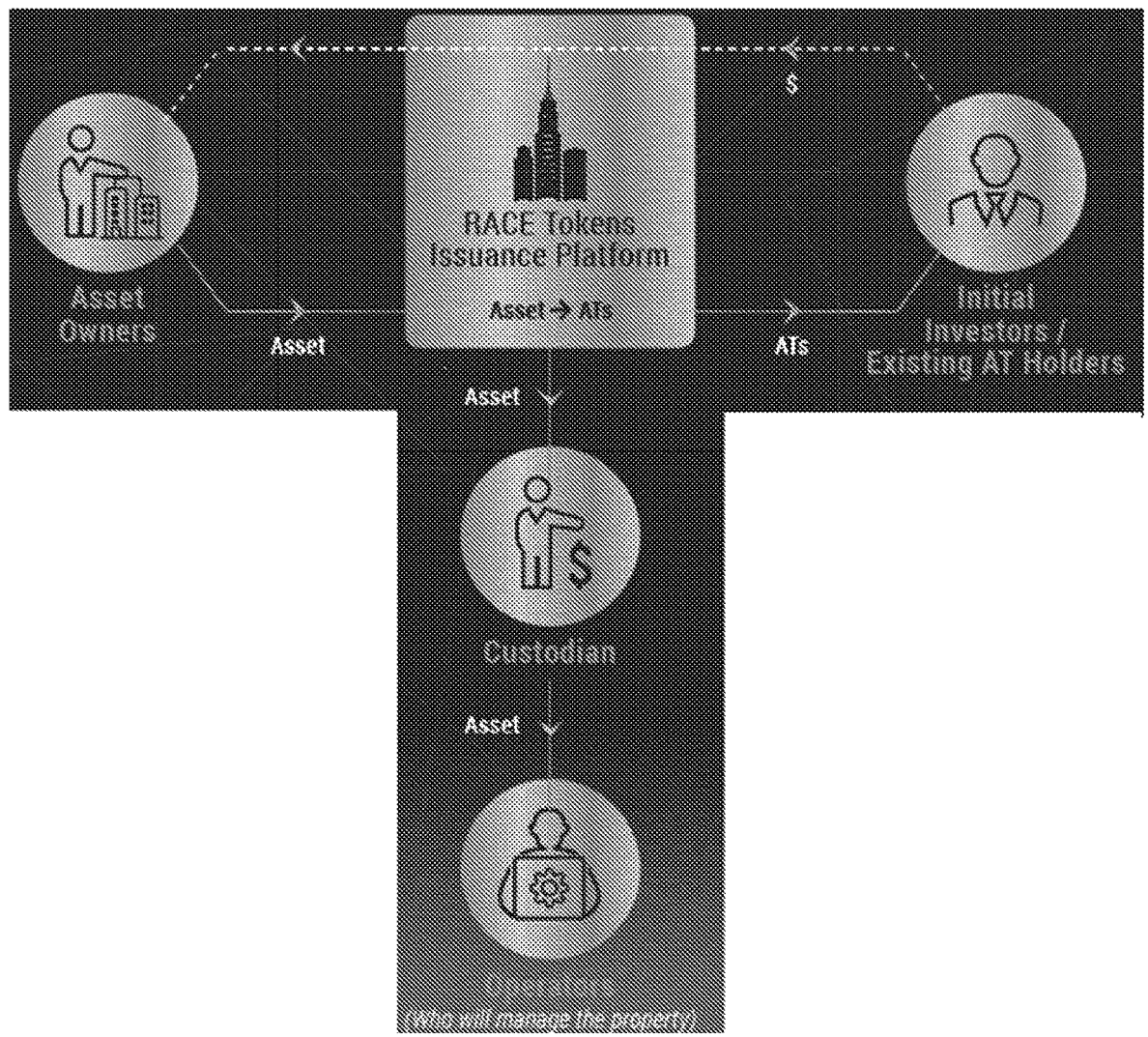
FIG. 9 illustrates an exemplary process for launching asset tokens in the Blockchain-based ecosystem in accordance with an embodiment of the invention.

FIG. 9 illustrates an exemplary process for launching asset tokens in Blockchain-based ecosystem 100 in accordance with an embodiment of the invention.

As illustrated in FIG. 9, asset owners put up their property for sale on token issuance platform 118, subjected to the approval through network consensus on Blockchain-based ecosystem 100. The property is then handed over to a custodian. Asset tokens are then put up on token issuance platform 118 for sale using asset token launching module 802. During the sale, asset tokens are sold at a fixed price, and any tokens not sold are given to the asset owners.

Listing of asset tokens on Blockchain-based ecosystem 100 requires project consensus. This involves participation of key stakeholders who form the community. The community is a crucial driving force behind a self-governing system where transparency is important and, as much as possible, free from the biased influence of singular individuals. The community consensus is controlled by smart contracts to carry out specific functions, assigning stakeholders to each decision with a fixed set of rules. These participants are required to own utility tokens to participate in the community decision making. The four main decision-making functions include: reviewing projects for asset tokenization, onboarding new stakeholders into the community, voting out bad actors on the platform, conflict resolution and changing governance parameters.

Upon closing the sale, proceeds from the sale are disbursed to the asset owners and asset tokens are distributed to the initial purchasers. The asset tokens are subsequently made available for trading on asset token exchange 808.

Figure 10:
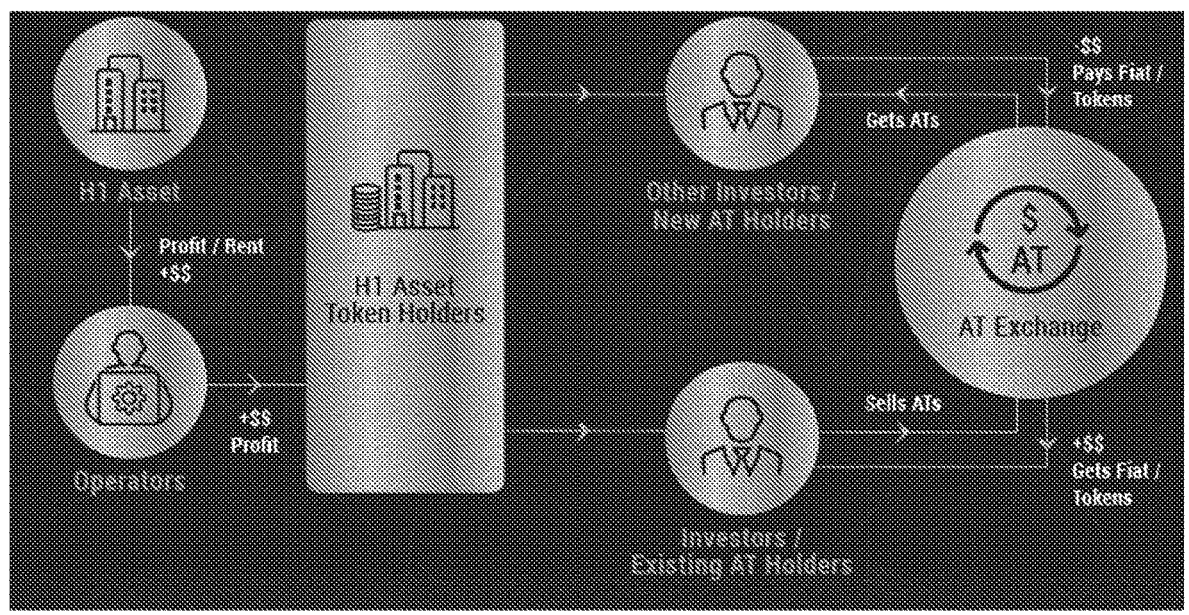
FIG. 10 illustrates an exemplary process for trading and maintenance of asset tokens in the Blockchain-based ecosystem in accordance with an embodiment of the invention.

FIG. 10 illustrates an exemplary process for trading and maintenance of asset tokens in Blockchain-based ecosystem 100 in accordance with an embodiment of the invention.

As illustrated in FIG. 10, money flows from H1 asset for example, mainly rent, passes through the operators. After deducting expenses and fees, such as property management fee for maintaining the property and other operating costs, the remaining profit is split among investors and asset token holders of this particular H1 asset tokens. These token holders can also sell the asset tokens on the secondary market to others, who then become the new H1 asset token holders.

Once the STO is completed, initial investors start selling their asset tokens on asset token exchange 808. Users who did not purchase tokens during the initial phase can purchase tokens here at market prices, and prices are left to the free market. These asset tokens are also used as transactional fees for trades and supported as a currency pairing against other asset tokens. Thereafter, rewards for asset token holders are settled via settlement engine 810 of tokenomics management module 120.

Figure 11:
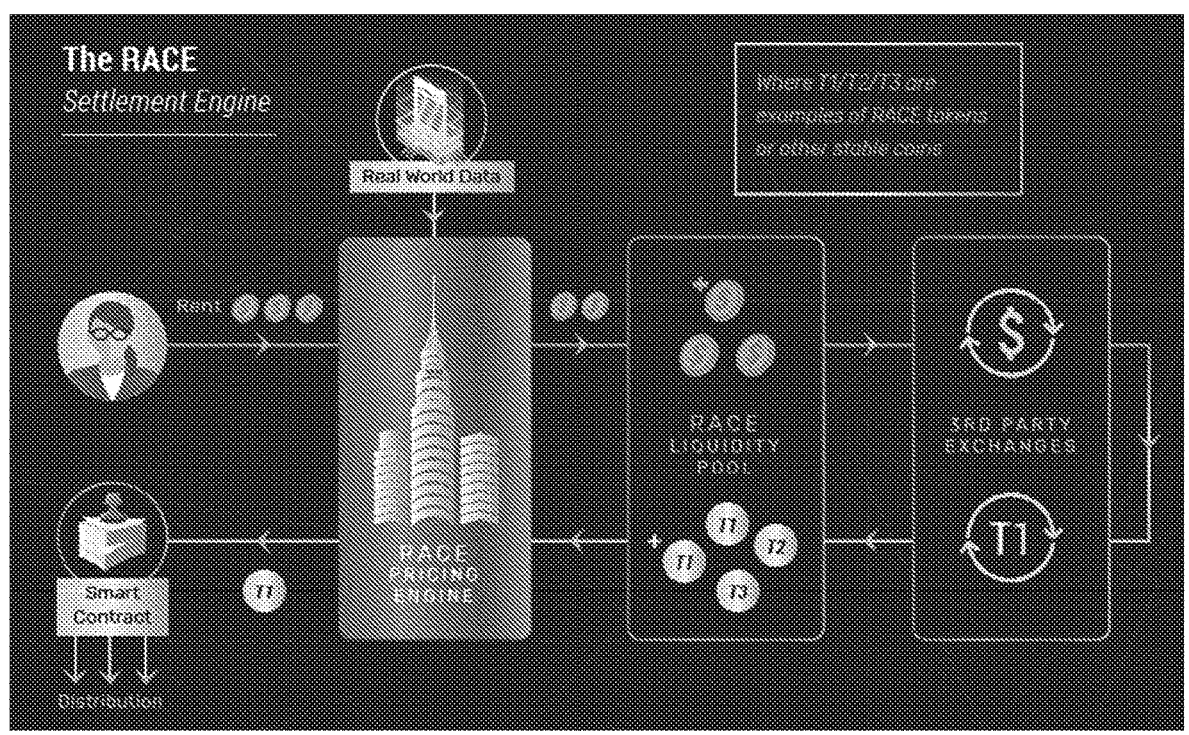
FIG. 11 illustrates a settlement engine in accordance with an exemplary embodiment of the invention.

FIG. 11 illustrates settlement engine 810 in accordance with an exemplary embodiment of the invention.

As illustrated in FIG. 11, cash flow received on the property is distributed through smart contracts with asset tokens or stable coins as the medium, settled through a smart contract through settlement engine 810. Settlement engine 810 collects fiat currency and pulls prices off third party exchanges and assigns a price to buy the respective currency. To ensure speed and to minimize exposure, a liquidity pool is used to perform the transactions on both ends at the same time to disburse the asset tokens immediately and not wait for third party exchanges and their withdrawal processes.

Figure 12:
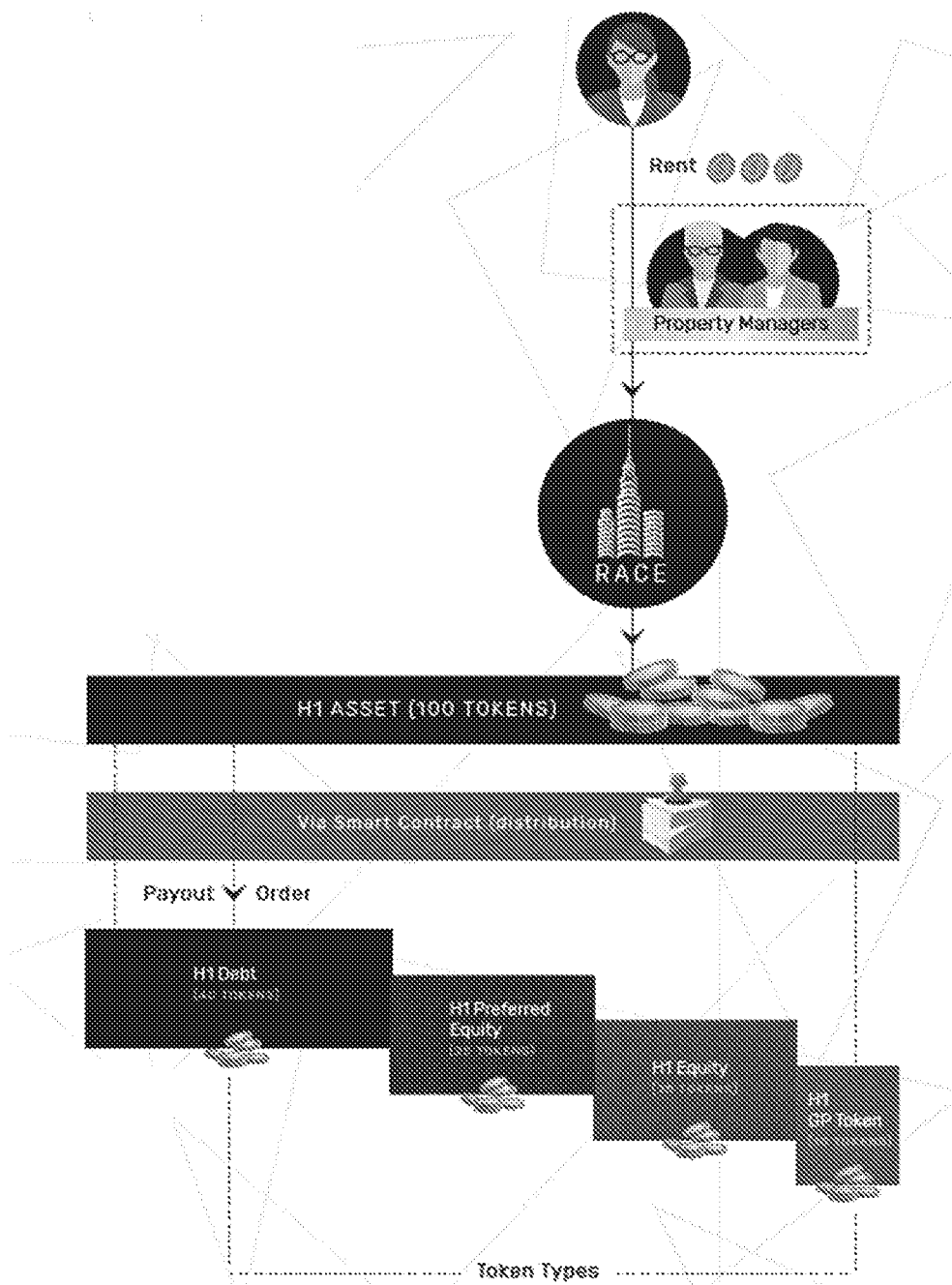
FIG. 12 illustrates asset token distribution flow to asset token holders in accordance with an embodiment of the invention.

FIG. 12 illustrates the asset token distribution flow to asset token holders in accordance with an embodiment of the invention.

As illustrated in FIG. 12, H1 is an example of a tokenized asset. The subclasses of the tokenized asset include, but need not be limited to, Senior Debt, Mezzanine Debt, Convertible Debentures, Common Equity, Preferred Equity and in some rare cases Warrants. Each sub-token type has separate functions and purposes as defined in the smart contract for the asset. Each sub-token also has different risk profiles, profit sharing rations, cashflow priorities and distribution timelines based on its place in the capital stack. The three commonly used asset token types are outlined in FIG. 12, however the needs of each project can vary as per asset type, project type and jurisdiction of the asset.

Figure 13:
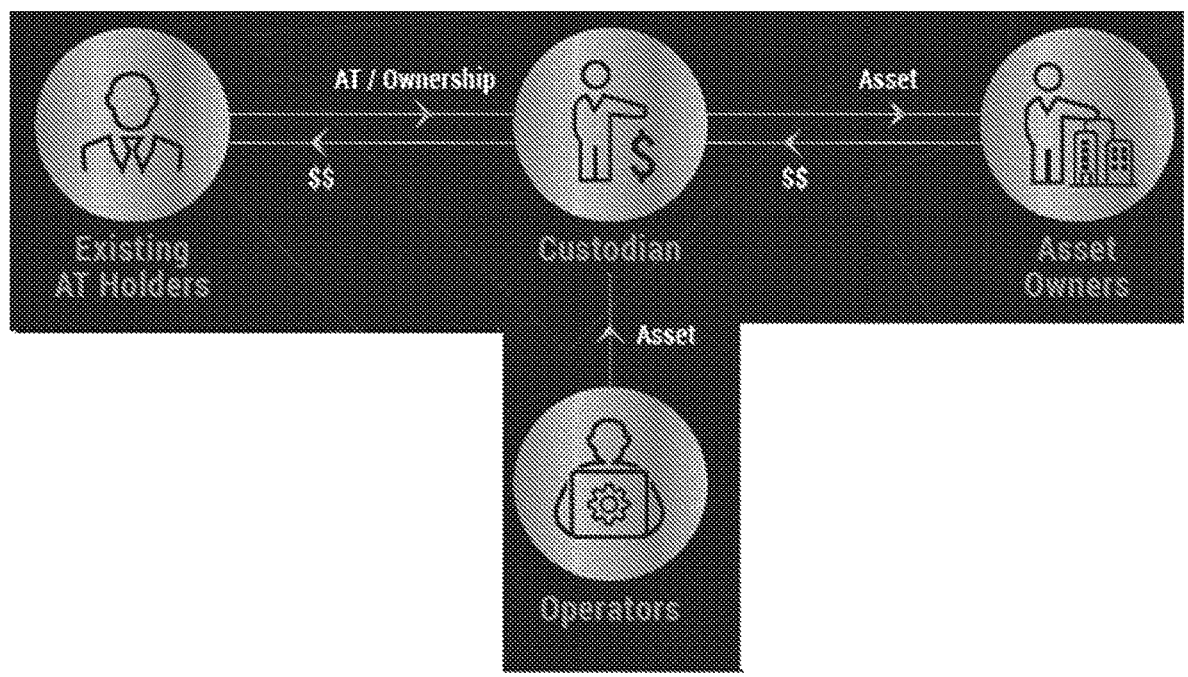
FIG. 13 illustrates an exemplary process for terminating/closing an asset or sale of property in the Blockchain-based ecosystem in accordance with an embodiment of the invention.

FIG. 13 illustrates an exemplary process for terminating/closing an asset or sale of property in Blockchain-based ecosystem 100 in accordance with an embodiment of the invention.

As illustrated in FIG. 13, upon the end-of-term of an asset, asset token termination module 814 provides multiple ways of exiting including, but need not be limited to, a buyback from initial property owner, full sale of property, and partial exit for investors. In the case that owners buy back the property, the operators hand over the asset to the custodian to initiate the closing process. The original asset owner or new asset owner pays the custodian for the asset, and a notice of sale is issued to the unique asset token holders. Further, secondary market trading is suspended, and transfer of ownership is locked. All asset tokens are then forcefully recalled to the token issuance platform 118 with a snapshot taken prior to being destroyed. Token issuance platform 118 then provides payouts in proportion to the ownership, the sale amount minus any fees incurred during the sale. This step concludes the end-of-life of the project.

Figure 14:
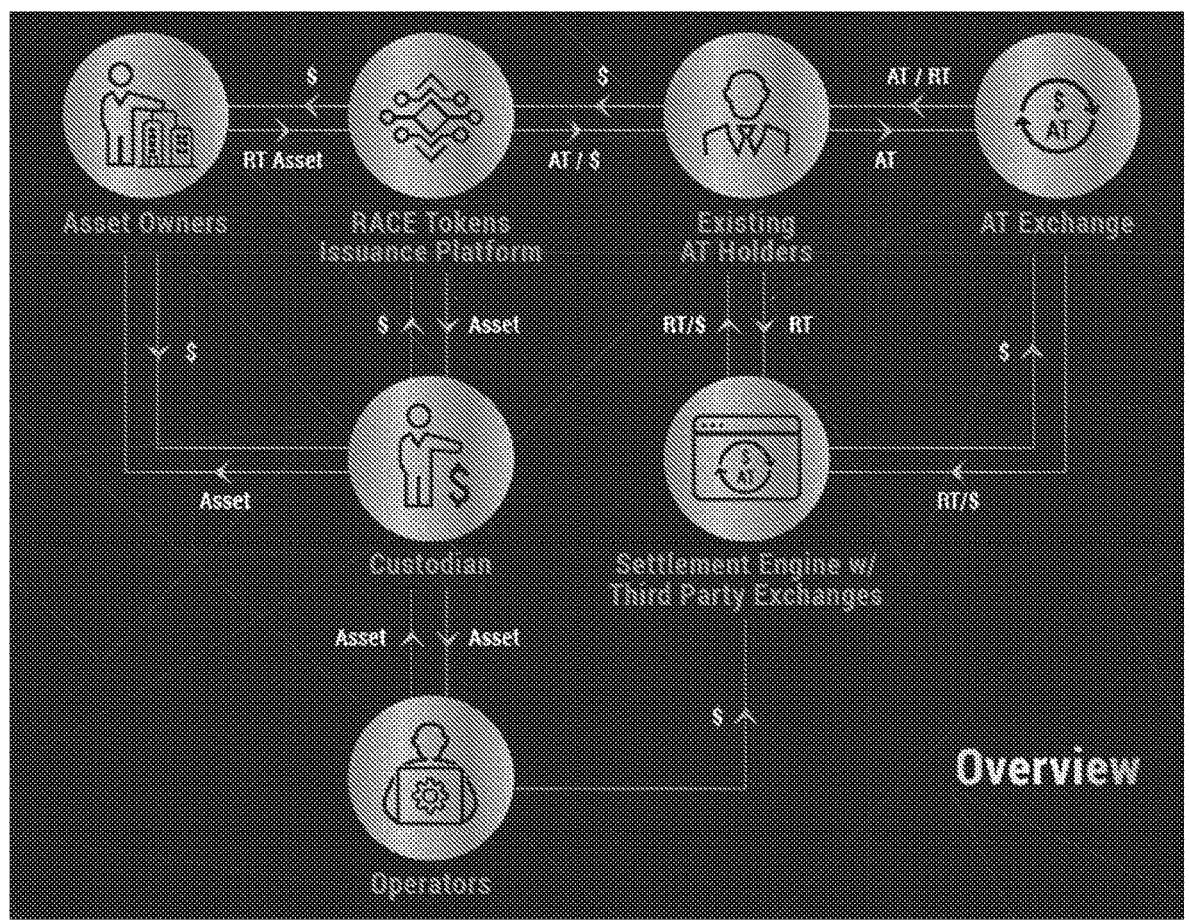
FIG. 14 illustrates how the overall steps from conception until end-of-life of an asset within the Blockchain-based ecosystem are combined, showing how each entity interacts with the others through transaction of fiat, utility tokens, assets and asset tokens.

FIG. 14 illustrates how the overall steps from conception until end-of-life of an asset within Blockchain-based ecosystem 100 are combined, showing how each entity interacts with the others through transaction of fiat, utility tokens, assets and asset tokens.

Figure 15:
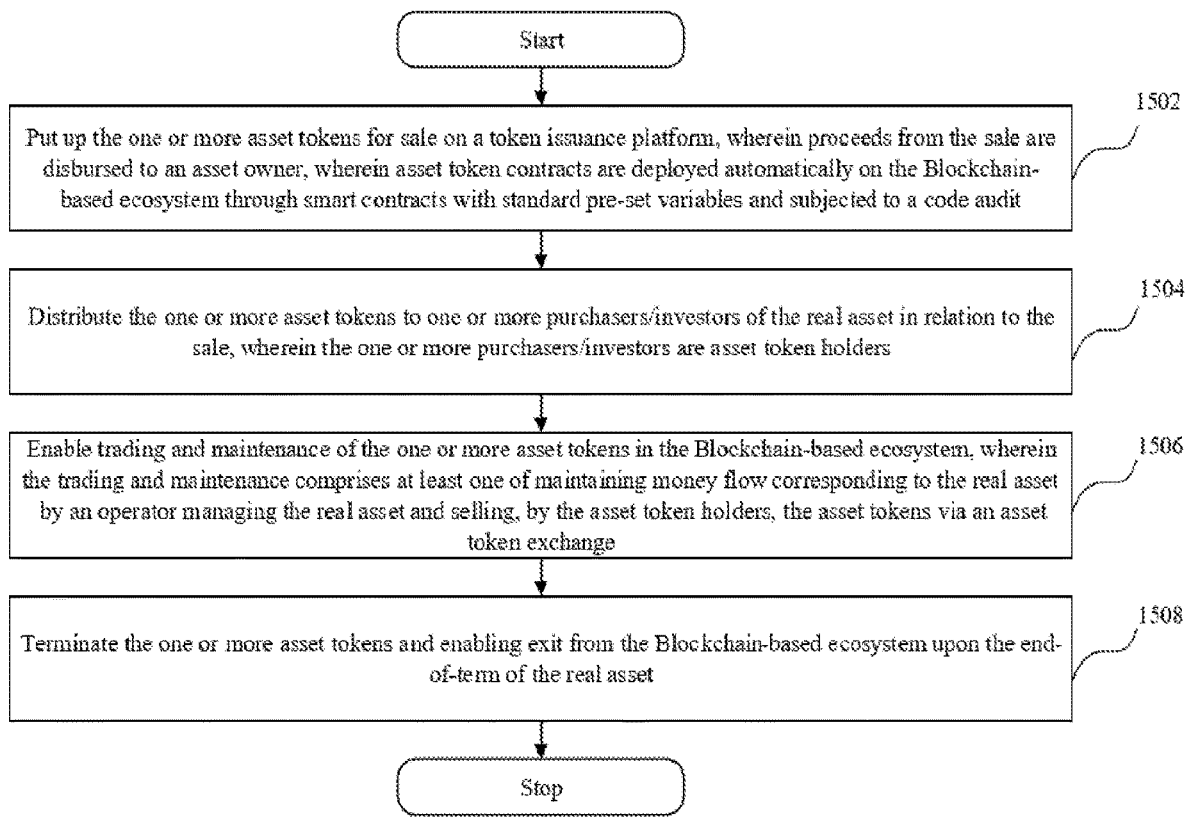
FIG. 15 illustrates a flowchart of a method for managing life cycle of a tokenized real asset in the Blockchain-based ecosystem in accordance with an embodiment.

FIG. 15 illustrates a flowchart of a method for managing life cycle of a tokenized real asset in Blockchain-based ecosystem 100 in accordance with an embodiment of the invention.

As illustrated in FIG. 15, at step 1502, one or more asset tokens associated with a real asset are put up for sale on token issuance platform 118 using asset token launching module 802. The real asset can be, but need not be limited to, real estate. The proceeds from the sale are then disbursed to the asset owner of the real asset. Asset token contracts are deployed automatically on Blockchain-based ecosystem 100 through smart contracts with standard pre-set variables and subjected to a code audit. The method of tokenization of the real asset is described in detail in conjunction with FIG. 16.

At step 1504, the one or more asset tokens are distributed to one or more purchasers/investors (asset token holders) of the real asset in relation to the sale via distribution module 804. The one or more purchasers/investors are asset token holders.

At step 1506, the process includes trading and maintenance of the one or more asset tokens in Blockchain-based ecosystem 100 using trading and maintenance module 806. The process of trading and maintenance includes, but is not limited to, maintaining money flow corresponding to the real asset by an operator managing the real asset, selling, by the asset token holders, the asset tokens via asset token exchange 808, and settling of rewards to the asset token holders via settlement engine 810 of Blockchain-based ecosystem 100.

Finally, at step 1508, the one or more asset tokens are terminated via asset token termination module 814, enabling exit from Blockchain-based ecosystem 100 upon the end-of-term of the real asset. This is done by either buyback of the real asset from initial property owner, full sale of the real asset and partial exit for investors.

Figure 16:
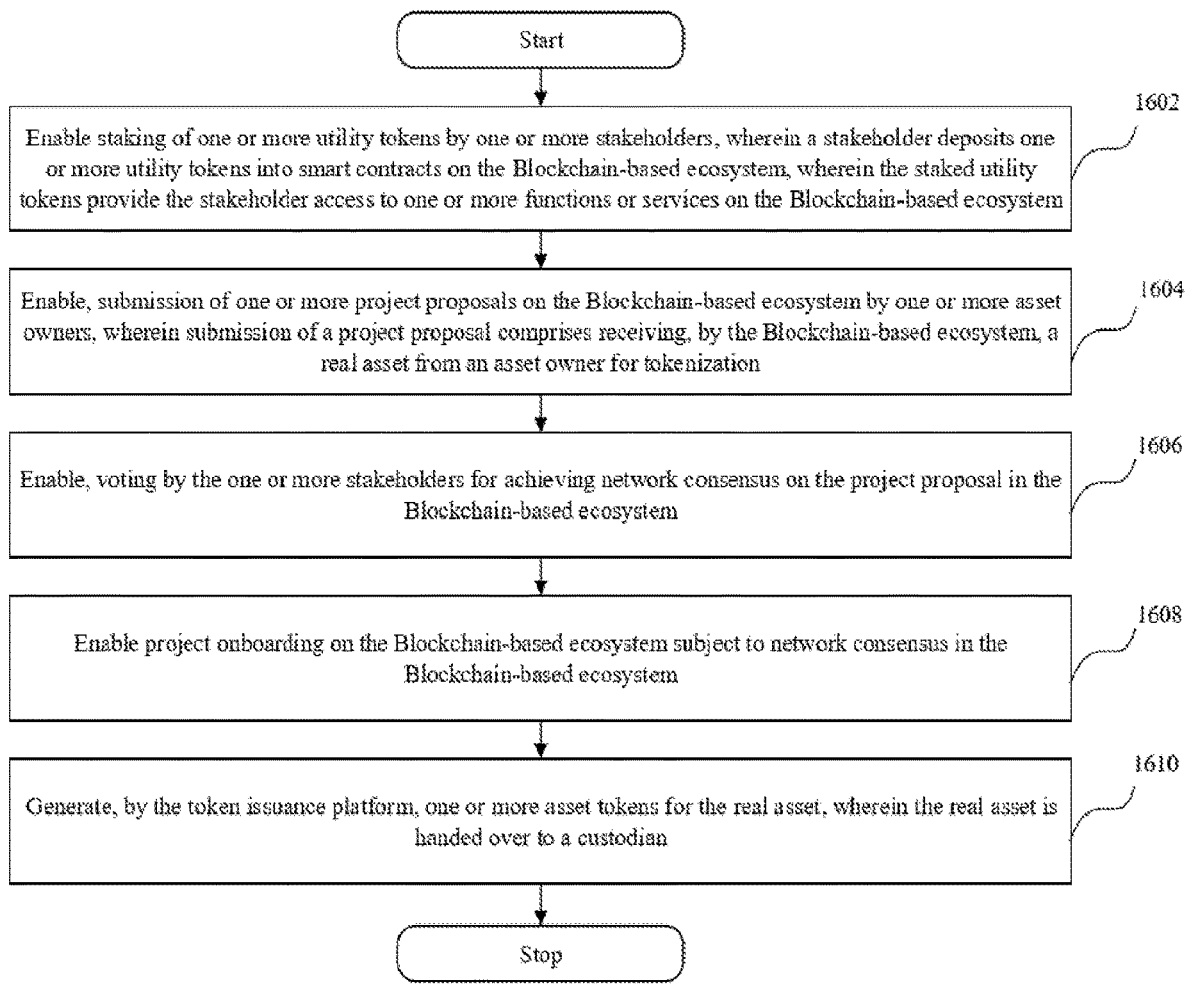
FIG. 16 illustrates a flowchart of a method for tokenizing a real asset in the Blockchain-based ecosystem in accordance with an embodiment of the invention.

FIG. 16 illustrates a flowchart of a method for tokenizing a real asset in Blockchain-based ecosystem 100 in accordance with an embodiment of the invention.

At step 1602, staking module 108 enables one or more stakeholders to stake one or more utility tokens. A stakeholder can be, but need not be limited to, a project proposer (GPs/property owners/developers), an investor (limited partners), an investment committee, a qualified service provider, and a general participant. The one or more stakeholders then deposit the one or more utility tokens into smart contracts on Blockchain-based ecosystem 100. The staked utility tokens provide the stakeholders access to one or more functions or services on the blockchain-based ecosystem. The one or more functions or services include, but need not be limited to, regulation enforcement, acting as arbiters, voting on changes to the network, submission of proposals for voting, asset development services, legal counsel, and brokering or asset management.

At step 1604, project proposal submission module 110 enables one or more asset owners to submit one or more project proposals on Blockchain-based ecosystem 100. In an embodiment, a project proposal submitted by an asset owner is for the tokenization of a real asset such as, but not limited to, real estate.

Upon submission of the project proposal, at step 1606, voting module 112 enables the one or more stakeholders to vote for achieving network consensus on the project proposal in the Blockchain-based ecosystem 100.

Subject to network consensus, at step 1608, project onboarding module 114 enables onboarding of the proposed project on Blockchain-based ecosystem 100. Project onboarding module 114 also enables gamification of the project onboarding process and extending expression of project interest to ordinary users such as prospects or platform users of Blockchain-based ecosystem 100. A real asset is to be vetted before it can go through tokenization and the asset token is issued through consensus of both network participants and a professional investment committee.

Thereafter, at step 1610, token issuance platform 118 generates one or more asset tokens for the real asset. The real asset is then handed over to a custodian.

The present invention is advantageous in that by bringing Blockchain into the archaic system of dealing with investments and asset management, the invention transforms the landscape by remedying the pain points mentioned in the prior art, in the form of tokenization. Tokenizing physical components essentially means to create a digital version of items, in this case real-world assets, and transacting it on the virtual space where Blockchain acts as a facilitator for more reliable business dealings.

The Blockchain is a decentralized, distributed and public digital ledger used to record transactions across a network of computers so that the record cannot be altered retroactively without consensus of the network. Therefore, the Blockchain is useful because it ensures greater reliability and transparency in any given transaction and bridges the gap of time and distance for peer-to-peer (global) transactions since digital processing of data is almost instantaneous.

Further, security is not sacrificed for speed and clarity because institutional regulation of tokens is enforced, and compliance can be coded into tokens. Tokens comprise of smart contracts designed to automatically execute when specific criteria are satisfied. Smart contracts dictate how the token can be traded in a compliant way, and because they are executed on the blockchain the transactions are transparent, traceable and immutable. Investors or traders are also only allowed to buy, sell, or trade if they have passed necessary KYC and Anti-Money-Laundering (AML) accreditation and are considered accredited investors.

Digitization on a decentralized network also means easier monitoring of activity and more vigilance against fraudulent behavior. This provides greater accountability and security within the ecosystem as compared to traditional operations. At the same time, assigning token value based on real-world assets allows for a much seamless transaction of these digital vehicles because time and money taken to process transactions can be disposed of. Such newfound efficiency entails greater liquidity for typically illiquid assets given that there is faster deal execution and compliance is verified virtually instantaneously.

The present invention facilitates commercial real estate ownership as a multi-generational wealth transfer tool, to enable cash flow to the everyday man in his/her real estate investment. Investing in real estate is proven to be a profitable long-term venture, however the traditional model consists of far too many unnecessary costs and layers between investors and their assets, making it highly inaccessible to the common demographic. To remedy this, the present invention aspires to disintermediate real estate finance to create a more conducive environment for everyday investors to partake in this sphere.

Further, the present invention leverages real world assets that can grow in social and financial value. Using the Blockchain-based ecosystem of the present invention, people can own assets at the lowest level legally possible in a fractionalized way. This ownership can be achieved without unnecessary intermediaries and exorbitant fees, via asset tokens. Via special purpose companies, where community members can hold fractions of the asset and wherein the transactions are Blockchain ratified, the invention allows the average man to enjoy the benefits of ownership such as collecting rent, asset appreciation but with quiet enjoyment all at the same time without the day-to-day headaches of owning institutional grade real assets.

Furthermore, with the present invention, all traditional real estate stakeholders are further empowered with a greater voice to how the ecosystem and industry should be run in a more prolific manner. The platform democratizes real estate investment through a sustained model of dual token ownership, and enables ease of investment, transparency, reduced layers and friction costs, increases liquidity, and reduces fees.

Thus, the present invention builds a collaborative digital momentum of moving real estate investments online to drive exponential growth. Further, the platform leverages the network effects, and utilizes the power of the crowd to get the best results and value for the community.

Those skilled in the art will realize that the above recognized advantages and other advantages described herein are merely exemplary and are not meant to be a complete rendering of all of the advantages of the various embodiments of the present invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the present invention have been described. However, one of ordinary skill in the art appreciates that various modifications and changes can be made without departing from the scope of the present invention. Accordingly, the specification and figures are to be regarded in an illustrative rather than a restrictive sense, and all such modifications are intended to be included within the scope of the present invention.

What is claimed is:

1. A method comprising:
   in a Blockchain-based ecosystem including processing circuitry:
   enabling, by the processing circuitry, staking of one or more utility tokens by one or more stakeholders based on deposit of the one or more utility tokens into smart contracts on the Blockchain-based ecosystem;
   providing, by the processing circuitry, the one or more stakeholders access to one or more functions or services on the Blockchain-based ecosystem based on the staking of the one or more utility tokens;
   enabling, by the processing circuitry, submission of one or more project proposals for tokenization of a real asset on the Blockchain-based ecosystem, wherein the submission of the one or more project proposals is by one or more asset owners;
   receiving, by the processing circuitry, the real asset from the one or more asset owners for the tokenization, wherein the reception of the real asset is based on the submission of the one or more project proposals;
   enabling, by the processing circuitry, voting by the one or more stakeholders for achieving network consensus on the one or more project proposals in the Blockchain-based ecosystem;
   enabling, by the processing circuitry, project onboarding of the one or more project proposals on the Blockchain-based ecosystem subject to the network consensus in the Blockchain-based ecosystem;
   generating, by the processing circuitry via a token issuance platform, one or more asset tokens for the real asset to tokenize the real asset, wherein the generation of the one or more asset tokens is
based on the submission of the one or more project
proposals, and the real asset is handed over to a custodian;

putting up, by the processing circuitry, the one or more
asset tokens for sale on the token issuance platform,
wherein proceeds from the sale are disbursed to the
one or more asset owners, and
wherein asset token contracts are deployed automatically on the Blockchain-based ecosystem by the
smart contracts with standard specific variables,
and the asset token contracts are subjected to a
code audit;

distributing, by the processing circuitry, the one or
more asset tokens to one or more purchasers or
investors of the real asset in relation to the sale,
wherein the one or more purchasers or investors are
asset token holders;

enabling, by the processing circuitry, trading and maintenance of the one or more asset tokens in the
Blockchain-based ecosystem, wherein the trading
and maintenance comprises at least one of:
maintaining money flow corresponding to the real
asset by an operator managing the real asset, or
selling, by the asset token holders, the asset tokens
via an asset token exchange; and terminating, by the processing circuitry, the one or
more asset tokens, and enabling exit from the Blockchain-based ecosystem upon an end-of-term of the
real asset.

2. The method of claim 1, wherein the real asset is a real estate property.

3. The method of claim 1, wherein each of the one or more stakeholders is at least one of a project proposer (GPs/property owners/developers), an investor (limited partners), an investment committee, a qualified service provider, or a general participant.

4. The method of claim 1, wherein the one or more functions or services comprise at least one of regulation enforcement, acting as arbiters, voting on changes to a network, submission of proposals for voting, asset development services, legal counsel, or brokering or asset management.

5. The method of claim 1, further comprising gamifying, by the processing circuitry, project onboarding and extending expression of project interest to ordinary users such as one of prospects users or platform users of the Blockchain-based ecosystem, wherein
the real asset is vetted before the tokenization, and
the one or more asset tokens are issued by consensus of both network participants and a professional investment committee.

6. The method of claim 1, wherein the maintaining of the money flow corresponding to the real asset comprises:
receiving, by the operator, the money flow corresponding to the real asset; and
computing, by the processing circuitry, profit for the asset token holders after deducting expenses and fees in relation to the money flow.

7. The method of claim 6, wherein the expenses and fees comprise at least one of property management fee for maintaining property and operating costs.

8. The method of claim 1, wherein the trading and maintenance further comprises settling of rewards to the asset token holders via a settlement engine of the Blockchain-based ecosystem.

9. The method of claim 1, wherein the enabling of the exit comprises at least one of buyback of the real asset from initial property owner, full sale of the real asset, or partial exit for the investors.

10. A Blockchain-based ecosystem, comprising:
a memory; and
processing circuitry communicatively coupled to the memory, wherein the processing circuitry is configured to:
enable staking of one or more utility tokens by one or more stakeholders based on deposit of the one or more utility tokens into smart contracts on the Blockchain-based ecosystem;
provide the one or more stakeholders access to one or more functions or services on the Blockchain-based ecosystem based on the staked one or more utility tokens;
enable submission of one or more project proposals, for tokenization of a real asset, on the Blockchain-based ecosystem by one or more asset owners;
receive, at the Blockchain-based ecosystem, the real asset from the one or more asset owners for the tokenization, wherein the reception of the real asset is based on the submission of the one or more project proposals;
enable voting, by the one or more stakeholders, for achievement of network consensus on the one or more project proposals in the Blockchain-based ecosystem;
enable project onboarding of the one or more project proposals on the Blockchain-based ecosystem subject to the network consensus in the Blockchain-based ecosystem;
generate, via a token issuance platform, one or more asset tokens for the real asset to tokenize the real asset, wherein
the generation of the one or more asset tokens is based on the submission of the one or more project proposals, and
the real asset is handed over to a custodian;
put up the one or more asset tokens for sale on the token issuance platform,
wherein proceeds from the sale are disbursed to the one or more asset owners, and
wherein asset token contracts are deployed automatically on the Blockchain-based ecosystem by the smart contracts with standard specific variables, and the asset token contracts are subjected to a code audit;
distribute the one or more asset tokens to one or more purchasers or investors of the real asset in relation to the sale, wherein the one or more purchasers or investors are asset token holders;
enable trade and maintenance of the one or more asset tokens in the Blockchain-based ecosystem, wherein the trade and maintenance comprises at least one of:
maintenance of money flow corresponding to the real asset by an operator managing the real asset, or
sell, by the asset token holders, the asset tokens via an asset token exchange; and
terminate the one or more asset tokens and enable exit from the Blockchain-based ecosystem upon an end-of-term of the real asset.

11. The Blockchain-based ecosystem of claim 10, wherein the real asset is a real estate property.

12. The Blockchain-based ecosystem of claim 10, wherein each of the one or more stakeholders is at least one of a Project Proposer (GPs/Property Owners/Developers), an Investor (Limited Partner), an Investment Committee, a Qualified Service Provider, or a General Participant.

13. The Blockchain-based ecosystem of claim 10, wherein the one or more functions or services comprise at least one of regulation enforcement, acting as arbiters, voting on changes to a network, submission of proposals for voting, asset development services, legal counsel, or brokering or asset management.

14. The Blockchain-based ecosystem of claim 10, wherein
the processing circuitry is further configured to gamify project onboarding and extend expression of project interest to ordinary users such as one of prospects users or platform users of the Blockchain-based ecosystem,
the real asset is vetted before the tokenization, and
the one or more asset tokens are issued by consensus of both network participants and a professional investment committee.

15. The Blockchain-based ecosystem of claim 10, wherein the processing circuitry is further configured to:
receive, by the operator, the money flow corresponding to the real asset; and
compute profit for the asset token holders after deduction of expenses and fees in relation to the money flow.

16. The Blockchain-based ecosystem of claim 15, wherein the expenses and fees comprise at least one of property management fee for maintenance of property and operating costs.

17. The Blockchain-based ecosystem of claim 10, wherein the processing circuitry is further configured to settle rewards to the asset token holders via a settlement engine of the Blockchain-based ecosystem.

18. The Blockchain-based ecosystem of claim 10, wherein the processing circuitry is further configured to enable the exit via at least one of buyback of the real asset from initial property owner, full sale of the real asset, or partial exit for the investors.

* * * * *